United States Patent
Gindrat et al.

(10) Patent No.: US 9,120,052 B2
(45) Date of Patent: Sep. 1, 2015

(54) PLASMA SPRAY METHOD FOR THE MANUFACTURE OF AN ION CONDUCTING MEMBRANE AND AN ION CONDUCTING MEMBRANE

(71) Applicant: OERLIKON METCO AG, Wohlen (CH)

(72) Inventors: Malko Gindrat, Wohlen (CH); Rajiv J. Damani, Winterthur (CH); Jochen Häring, Constance (DE)

(73) Assignee: OERLIKON METCO AG, Wohlen (CH)

( * ) Notice: Subject to any disclaimer, the term of this patent is extended or adjusted under 35 U.S.C. 154(b) by 0 days.

(21) Appl. No.: 13/851,428

(22) Filed: Mar. 27, 2013

(65) Prior Publication Data
US 2013/0255499 A1    Oct. 3, 2013

(30) Foreign Application Priority Data
Mar. 28, 2012 (EP) ..................................... 12161868

(51) Int. Cl.
| B01D 53/22 | (2006.01) |
| C23C 4/12 | (2006.01) |
| B01D 67/00 | (2006.01) |
| B01D 71/02 | (2006.01) |

(Continued)

(52) U.S. Cl.
CPC .......... B01D 53/228 (2013.01); B01D 67/0072 (2013.01); B01D 71/024 (2013.01); C01B 3/503 (2013.01); C01B 13/0255 (2013.01); C23C 4/105 (2013.01); C23C 4/127 (2013.01); B01D 2323/42 (2013.01)

(58) Field of Classification Search
CPC .. B01D 53/22; B01D 53/228; B01D 67/0039; B01D 67/0072; B01D 69/10; B01D 71/024; B01D 2323/42; C23C 4/105; C23C 4/127; C23C 14/027; C23C 14/028; C23C 14/083; C23C 28/30; C01B 3/503; C01B 13/0255
USPC ............. 95/45, 54, 55, 56; 96/4, 11; 427/446, 427/453, 576
See application file for complete search history.

(56) References Cited

U.S. PATENT DOCUMENTS

| 5,853,815 A | 12/1998 | Muehlberger |
| 6,200,541 B1 | 3/2001 | Kleefisch et al. |

(Continued)

FOREIGN PATENT DOCUMENTS

| EP | 1338671 A1 * | 8/2003 | ............. B01D 71/02 |
| EP | 2 030 669 A1 | 3/2009 | |

(Continued)

*Primary Examiner* — Jason M Greene
(74) *Attorney, Agent, or Firm* — Greenblum & Bernstein, P.L.C.

(57) ABSTRACT

A plasma spray method for the manufacture of an ion conducting membrane, in particular of a hydrogen ion conducting membrane or of an oxygen ion conducting membrane. In the method, the membrane is deposited as a layer on a substrate in a process chamber, wherein a starting material is sprayed onto a surface of the substrate by means of a process gas in the form of a process beam. The starting material is injected into a plasma at a low process pressure which is at most 10000 Pa and is partially or completely melted there. In accordance with the invention, the substrate has pores which are connected amongst one another so that the substrate is gas permeable and a portion of an overall pore area of an overall area of the coating surface amounts to at least 30% or, in a particular embodiment, to at least 40%.

24 Claims, 2 Drawing Sheets

(51) Int. Cl.
*C01B 3/50* (2006.01)
*C01B 13/02* (2006.01)
*C23C 4/10* (2006.01)

(56) References Cited

U.S. PATENT DOCUMENTS

| | | | |
|---|---|---|---|
| 6,638,575 B1 | 10/2003 | Chen et al. | |
| 2005/0013933 A1* | 1/2005 | Chen et al. | 427/181 |
| 2005/0061663 A1* | 3/2005 | Chen et al. | 204/295 |
| 2009/0136695 A1* | 5/2009 | Damani et al. | 428/34.4 |
| 2011/0105816 A1* | 5/2011 | Sangar et al. | 585/403 |
| 2011/0132772 A1* | 6/2011 | Hendriksen et al. | 205/763 |
| 2012/0240771 A1* | 9/2012 | Gindrat et al. | 96/11 |
| 2013/0220126 A1* | 8/2013 | Hospach et al. | 96/4 |

FOREIGN PATENT DOCUMENTS

| | | |
|---|---|---|
| WO | WO-00/68139 A1 | 11/2000 |
| WO | WO-03/087422 A1 | 10/2003 |

\* cited by examiner

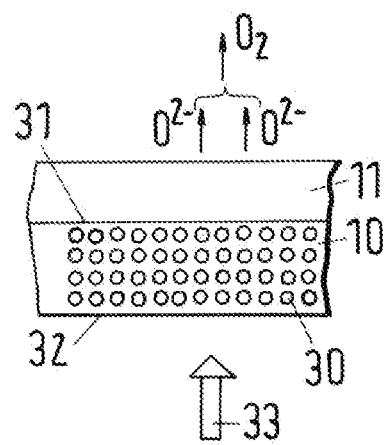
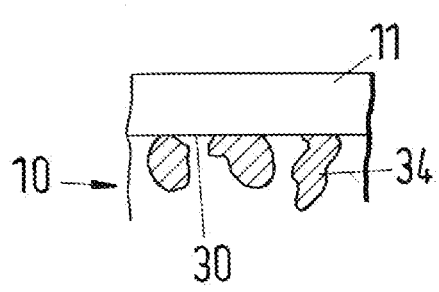
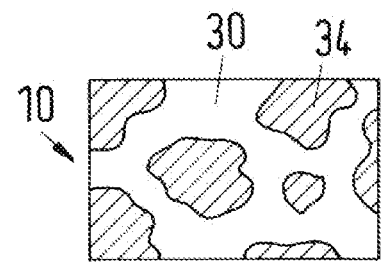
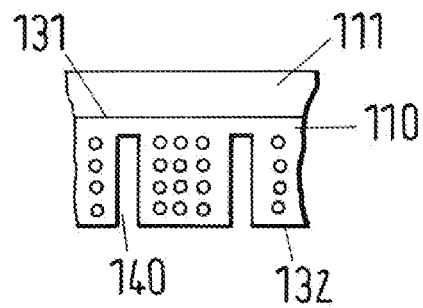

PLASMA SPRAY METHOD FOR THE MANUFACTURE OF AN ION CONDUCTING MEMBRANE AND AN ION CONDUCTING MEMBRANE

CROSS-REFERENCE TO RELATED APPLICATION

The present application claims priority under 35 U.S.C. §119 of European Patent Application No. 12161868.0 filed on Mar. 28, 2012, the disclosure of which is expressly incorporated by reference herein in its entirety.

BACKGROUND

The invention relates to a plasma spray method for the manufacture of an ion conducting membrane, in particular of a hydrogen ion conducting membrane or of an oxygen ion conducting membrane, and to an ion conducting membrane itself, in particular a hydrogen ion conducting membrane or an oxygen ion conducting membrane.

Ion conducting membranes are membranes that have a high selective permeability for specific ions. Oxygen permeable membranes are layers which have a high selective permeability for oxygen or oxygen ions and are substantially impermeable for other gases or ions. Correspondingly, such membranes are used in order to extract or to purify oxygen from gas mixtures or from fluid mixtures. The same is true for hydrogen permeable membranes for the extraction of hydrogen from gas mixtures or from fluid mixtures.

Such membranes can be manufactured from different materials. They can, for example, be composed of complex oxide materials which have a specific chemical composition and form specific phases. In particular, ceramic membranes are known which are composed of oxides of the perovskite type and which are manufactured in the form of thin, dense— this means non-porous—layers. Such membranes, for example, have both an ion conductivity for oxygen or hydrogen and also have an electron conductivity.

A material that is investigated and used today for the manufacture, in particular of oxygen permeable membranes is a ceramic material which has a perovskite structure and includes the elements lanthanum (La), strontium (Sr), cobalt (Co), and iron (Fe) besides oxygen. The substance is typically referred to as LSCF in accordance with the respective first letters of these four elements.

Oxygen permeable or hydrogen permeable membranes or generally ion conducting membranes of such materials can, for example, be manufactured by means of conventional manufacturing techniques for ceramics, such as, for example, pressing, tape casting, slip casting, or sintering or also by means of thermal spraying. In particular, thermal spray processes are suitable for the latter which are carried out in a vacuum. This typically means that the spray process is carried out at a process pressure that is smaller than the environmental pressure (normal air pressure)

A thermal low pressure plasma spray process or a vacuum plasma spray process is in particular suitable which is referred to as LPPS method (low pressure plasma spraying). By means of this vacuum plasma spray method particularly thin and dense layers can be sprayed particularly well, i.e., such layers which are also required for an ion conducting or oxygen permeable or hydrogen permeable membrane.

In this connection, the ion conducting membrane is deposited as a layer on a substrate in a process chamber. For this purpose, starting material is sprayed onto a surface of the substrate by means of a process gas in the form of a process beam. The starting material is injected into a plasma at a low process pressure which, for example, is at most 10,000 Pa and is partially or completely melted there.

During an LPPS method the ion conducting membrane is deposited on a substrate in the form of a layer. The substrate generally serves the purpose of supporting the thereby arising very thin and brittle layer and to thus make it manageable.

SUMMARY

The invention provides a plasma spray process with which a manageable combination of substrate and ion conducting membrane, in particular a hydrogen ion conducting membrane or an oxygen ion conducting membrane, can be manufactured which moreover enables an effective extraction, in particular of hydrogen or of oxygen, from gas mixtures or from fluid mixtures. The invention further provides a resistant combination of ion conducting membrane, in particular of a hydrogen ion conducting membrane or of an oxygen ion conducting membrane, on a metallic porous substrate that moreover enables an effective extraction, in particular of hydrogen or of oxygen from gas mixtures or from fluid mixtures.

In accordance with the invention, the substrate has pores that are connected amongst one another so that the substrate is gas permeable and a portion of an overall pore area of an overall area of the coating surface amounts to at least 30%, in particular to at least 40%, thus, for example, 40% or 45%. The sum of all surfaces of the open pores of the coating surface of the substrate should be understood to be the overall pore surface. The gas mixture from which, in particular hydrogen or oxygen should be extracted is guided to the open pores at the coating membrane and comes into contact there with the membrane from a back substrate side lying remote from the coating surface via the pores connected amongst one another. The hydrogen or oxygen ions can then permeate through the membrane starting from the open pores and thus hydrogen or oxygen can be extracted from the gas mixture.

Thereby, the substrate can also guide the fluid mixture or the gas mixture from which the hydrogen or oxygen should be extracted to the membrane in addition to supporting the membrane. Furthermore, it is ensured by the mentioned lower boundary of the overall pore surface that a large portion of the membrane also comes into contact with the fluid mixture or the gas mixture and thus that an effective extraction of hydrogen or oxygen is also ensured.

The overall pore area, for example, can be determined thereby that the pores of the coating surface are colored in and the area of the colored in pores is determined by an optical measurement process.

In an embodiment of the invention, the pores have a mean pore size of at least 1 micrometer, with this statement, in particular not only relating to the pores at the substrate surface, but also to the pores in the interior of the substrate. The mean pore size is, in particular determined thereby that, as described above, the open pores resulting from a cut through the substrate are colored in. In order to determine the mean pore size a straight line is subsequently placed onto the cut. Then the individual sections of the mentioned line, which sections lie on the pores are measured and a mean value is formed from the measured lengths. This mean value corresponds to the mean pore size.

Investigations have shown that the through-flow is strongly hindered which results in a worse transport of the gas mixture to the membrane for pores having a pore size smaller than 1 micrometer.

In an embodiment of the invention the substrate has a useful porosity of at least 20%, in particular of at least 30%, thus, for example, 30% or 40% with respect to an overall volume of the substrate. The useful porosity results from the quotient of a hollow space volume connected amongst one another to the overall volume of the substrate. The thus so-called closed hollow spaces which have no connection to the environment of the substrate are not of interest here. The open hollow spaces result in the pores at the coating surfaces of the substrate via which pores the gas mixture or fluid mixture can come into contact with the membrane.

The gas mixture or the fluid mixture is particularly well-guided to the membrane which enables a particularly effective extraction of hydrogen or of oxygen from gas mixtures or fluid mixtures due to the use of a substrate having the mentioned porosity.

An estimation of the porosity can also take place starting from the above-mentioned determination of the overall pore area. On the assumption that the overall pore area is approximately equal in each of the layers parallel to the coating surface the porosity can thereby be calculated.

The useful porosity can, for example, be determined thereby that it is determined which volume of a gas or a fluid the substrate can take up. The useful porosity can then be determined from the ratio of thus determined volume to the overall volume of this substrate.

The substrate is in particular manufactured by means of a sintering method. Thereby a free shaping of the substrate is enabled and a particularly high porosity of the substrate can furthermore be achieved.

In an embodiment of the invention, micro-passages are introduced into the substrate before or after the coating for the improvement of a gas flow possibility in the direction of a coating surface. The micro-passages in particular have a diameter of between 5 and 150 micrometers and are typically introduced into the substrate by means of a laser drilling method. Thereby a particularly effective transport of the gas mixture or of the fluid mixture to the membrane is possible.

The micro-passages are in particular orientated in the direction of the coating surface from a back substrate side lying remote form the coating surface and end before the coating surface. Thereby, the gas mixture or fluid mixture that is guided via the back substrate side is, on the one hand, very effectively guided to the membrane. On the other hand, it is prevented through the ending before the coating surface that too large recesses arise at the coating surface which, as described above, negatively influence the quality of the layer and thus of the membrane too strongly.

It is also possible that the micro-passages reach up to the coating surface and therefore quasi form a pore. The introduction then takes place, in particular prior to the coating so that the micro-passages are covered by the membrane.

Since the membrane with the substrate should be used in particular also in highly corrosive environments and at high temperatures of above 500° C., the iron alloy should include chromium, whereby a high resistance to corrosion can be achieved.

In an embodiment of the invention it is therefore provided that the substrate, on which the layer forming the membrane is deposited, is manufactured from an iron alloy which has a chromium portion which is larger than 20 weight percent and in particular larger than 25 weight percent, i.e., for example, 22 or 30 weight percent.

It is thereby achieved that the substrate and thus also the combination of substrate and ion conducting membrane is very resistant and in particular corrosion resistant. At the same time the membrane manufactured by means of the plasma spray method has a good ion conductivity, whereby an effective extraction of hydrogen or oxygen from gas mixtures or from fluid mixtures is enabled.

Besides chromium, the iron alloy can in particular also include carbon. Furthermore, also further constituents such as, for example, cobalt, manganese, molybdenum, niobium, vanadium, or tungsten can be present.

The substrate can, for example, be made of an alloy of 47% nickel (Ni), 22% chromium (Cr), 18% iron (Fe), 9% molybdenum (Mo), 1.5% cobalt (Co), 0.6% tungsten (W), 0.1% carbon (C), 1% manganese (Mn), 1% silicon (Si), and 0.008% boron (B).

The chromium included in the substrate can, however, lead to problems on carrying out the method at too high temperatures of the substrate. Chromium particles can then easily arrive in the coating surface and react to chromium oxide there. Thereby a layer can arise which hinders an ion exchange between gas and membrane. Furthermore, chromium oxide cannot conduct any electrons. However, excess electrons arise during use of the membranes which electrons then have to be guided away from the substrate. In this respect, a chromium oxide layer would likewise be of hindrance.

In the method in accordance with the invention, relatively high temperatures arise at the substrate due to the working principle. This is true for the coating process itself, but is also true for a heating phase of the substrate which takes place prior to the actual coating. In this respect, a formation of the described chromium oxide layer can be brought about. On the other hand, however, also the danger is present that the structure of the substrate is damaged by too high temperatures. These damages are referred to as so-called "creeping".

In an embodiment of the invention process parameters are set so that a temperature of the substrate amounts to between 250 and 850° C. during the deposition of the layer. In this connection in particular a process enthalpy, a spacing of the substrate to a plasma torch and a period of time in which the process beam is applied to the substrate without interruption or a frequency of the application with the process beam are to be understood as process parameters.

Dense layers can be generated in a comparatively short time in the mentioned temperature range which is required for the use of the layer as a membrane.

The temperature of the substrate can be measured during the process by means of a pyrometer known per se. In this connection, the heat radiation emitted by the substrate is measured and evaluated. The measured temperatures can be used for a regulation of the process parameters. However, it is also possible that the temperatures are determined in a test phase and that the required process parameters for maintaining the temperature boundaries are determined in this test phase. The so determined process parameters can then be used for a subsequent application of the method and the temperature boundaries can thus be maintained.

The described damages of the substrate through "creeping" and/or through the formation of chromium oxide are not only dependent on the absolute temperature, but also on the duration of the temperature that is applied.

For this reason, the process parameters are set, in particular so that a temperature of the substrate is only higher than the temperature boundary for a maximum period of time during the carrying out of the method. The maximum temperature and the maximum period of time are strongly dependent on the material of the substrate. On the use of a metallic substrate, for example, having the above-mentioned composition, the maximum temperature amounts to in particular 800° C. and the maximum period of time in particular amounts to 5 minutes. Furthermore, the above-mentioned temperature range of 250 to 850° C. is still true for the maximum temperature.

In a particular embodiment, an inert atmosphere or an atmosphere with reduced oxygen content is present during the spraying in the process chamber.

The membrane can also have an electron conductivity besides its ion conductivity.

The plasma spray process can be carried out so that the plasma defocuses and accelerates the process beam. Particularly good thin and dense layers can be manufactured by means of this method.

In practice, it has been found advantageous when the process pressure in the process chamber is set to a value of at least 50 Pa and to at most 2000 Pa.

In a particular embodiment, the layer forming the membrane is composed of a ceramic material that is an oxide of the perovskite type.

The method is in particular carried out so that the starting material (precursor) is a powder whose chemical composition is substantially the same as the chemical composition of the layer, this means that a powder is used as a starting material that substantially has the same chemical composition that the layer sprayed should also have.

With regard to the oxygen permeability, it has been advantageously shown that the layer should be composed of a perovskite which includes lanthanum (La), strontium (Sr), cobalt (Co), and iron (Fe). In this connection the term "composed of" is understood to mean that the substantial portion of the layer is present in the form of a perovskite phase. It is also possible that also other phases are present to a lesser degree in this layer.

For the manufacture of in particular hydrogen permeable membranes, for example, a ceramic having a perovskite structure can be used which includes the elements barium (Ba), zirconium (Zr), cerium (Ce), yttrium (Y), ytterbium (Yb) and europium (Eu) or lanthanum (La), strontium (Sr), chromium (Cr), yttrium (Y), and aluminum (Al).

In a particular embodiment, the plasma spray method is carried out so that the layer generated on the substrate has a thickness of less than 150 micrometers or, for example, in a more narrow range, 20 to 60 micrometers. This layer thickness has been tried and tested for oxygen permeable membranes or for hydrogen permeable membranes.

In practice it has been tried and tested that the overall flow rate of the process gas on plasma spraying is smaller than 200 SLPM and in particular amounts to 100 to 160 SLPM (SLPM: standard liter per minute).

For a first exemplary embodiment of the method, the process gas is a mixture of argon and helium.

For a second exemplary embodiment of the method the process gas is composed of argon, helium, and hydrogen.

It has also been found advantageous when the process beam is pivoted or rastered (scanned) relative to the surface of the substrate. This can be done, for example, by the pivoting of the plasma generator and/or of the plasma source and/or of the exit nozzle. The process beam is thus guided relative to the substrate so that the substrate is rastered, i.e., the substrate is covered once or a plurality of times by the process beam. Alternatively, or in addition, it is also possible to move the substrate. Many possibilities are possible to realize this relative movement between the process beam and the substrate. This pivot movement and/or rastering of the substrate has the effect that the oxygen introduced into the process chamber comes into contact with the process beam or with the layer being formed on the substrate in an as good as possible manner.

An ion conducting membrane on a metal porous substrate, in particular an oxygen permeable membrane or a hydrogen permeable membrane, is further provided by the invention, which membrane is deposited as a layer on the substrate by means of a plasma spray method in a process chamber, wherein a starting material in the form of a process beam is sprayed onto a surface of a substrate by means of a process gas, with the starting material being injected at a low process pressure, which is at most 10,000 Pa and is partially or completely melted there, and the substrate is manufactured from a metal alloy which has a chromium proportion of between 5 and 20 weight percent.

BRIEF DESCRIPTION OF THE DRAWINGS

In the following, the invention will be explained in detail by means of embodiments and with reference to the drawings. In the schematic drawing there is partially shown in section:

FIG. 2 is a schematic illustration of a substrate having a layer deposited on the substrate;

FIG. 3 is a detail of the substrate having the layer;

FIG. 4 is a detail of the substrate in a top view; and

FIG. 5 is a second embodiment of the substrate having a layer.

DETAILED DESCRIPTION

Figure 1:
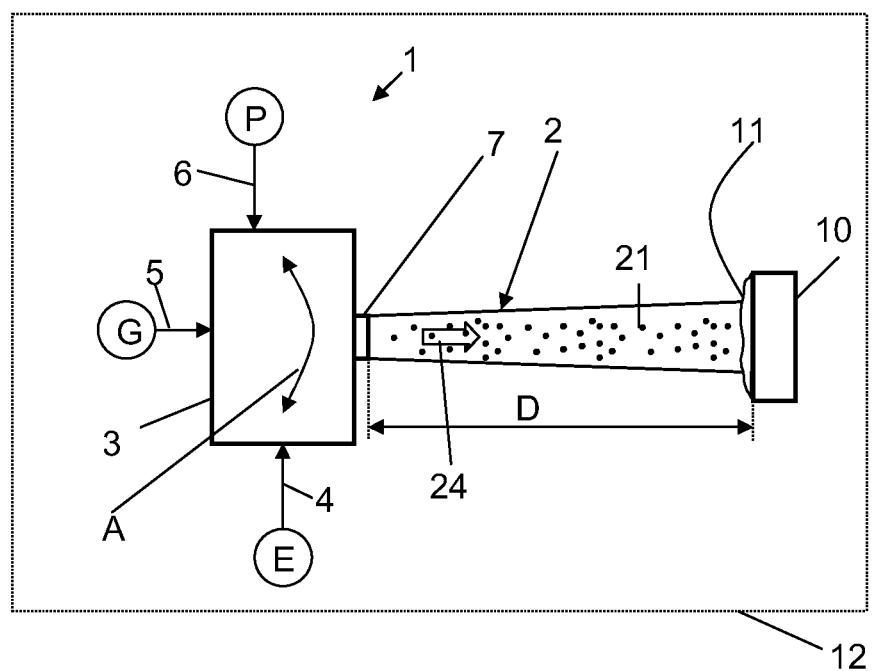
FIG. 1 is a schematic illustration of an apparatus for carrying out a method in accordance with the invention.

The plasma spray method for the manufacture of an ion conducting membrane in accordance with the invention is explained in the following description with reference to the case of application particularly relevant to practice, in which the membrane is a permeable membrane selective for oxygen which thus has an ion conductivity for oxygen. According to the invention, the membrane can also have an electron conductivity. The method is a thermal spray method which is carried out in a vacuum, thus at a process pressure which is smaller than the environmental pressure.

FIG. 1 shows a plasma spray apparatus in a very schematic illustration which is totally referred to with the reference numeral 1 and is suitable for carrying out a method in accordance with the invention. A metallic porous substrate 10 is furthermore illustrated in FIG. 1 schematically, onto which an oxygen permeable membrane in the form of layer 11 is deposited. A process chamber 12 is further indicated in which the method is carried out.

The method in accordance with the invention includes a plasma spraying which is described in kind in WO-A-03/087422 or also in U.S. Pat. No. 5,853,815. This plasma spray method is a thermal spraying for the manufacture of a so-called LPPS thin film (LPPS=Low Pressure Plasma Spraying).

A LPPS-based method is specifically carried out with the plasma spray apparatus 1 illustrated in FIG. 1. During this a conventional LPPS plasma spray method is changed from a process point of view, wherein a space, which is through-flowed by plasma ("plasma flame" or "plasma beam"), is widened due to the change and is widened to a length of up to 2.5 m. The geometric extent of the plasma leads to a uniform widening—a "defocusing"—and to an acceleration of a process beam which is injected into the plasma with a feed gas. The material of the process beam which is dispersed in the plasma to a cloud and is partially or completely melted there arrives evenly distributed at the surface of the substrate 10.

The plasma spray apparatus 1 illustrated in FIG. 1 includes a plasma generator 3, known per se, having a non-closer illustrated plasma torch for the generation of a plasma. In a manner known per se, a process beam 2 is generated by the plasma generator 3 from a starting material P, a process gas or a process gas mixture G and electrical energy E. The introduction of these components E, G, and P is symbolized in FIG. 1 by the arrows 4, 5, and 6. The generated process beam 2 exits through an exit nozzle 7 and transports the starting material P in the form of a process beam 2, in which the material particles 21 are dispersed in the plasma. This transport is symbolized by the arrow 24. The material particles 21 are generally powder particles. The morphology of the layer 11 deposited on the substrate is dependent on the process parameters and in particular on the starting material P, the process enthalpy, and the temperature of the substrate 10. The plasma generator 3 and/or the plasma torch can be movable, such as being pivotable with regard to the substrate 10 as is indicated by the double arrow A in FIG. 1. Thus, the process beam 2 can be moved to and fro over the substrate 10 in a pivot movement.

It can be determined for how long and how frequently a certain point on the substrate 10 is impinged by the process beam without interruption by the to and fro movement. The longer this period of time is or the more frequent this point is impinged, the higher the temperature of the substrate 10 is at this point. The to and fro movement, as well as the other process parameters, are set so that a temperature of the substrate 10 amounts to between 250 and 850° C. The process parameters required for this are determined in particular in test runs. Furthermore, the process parameters are set so that the temperature of the substrate is only greater than 800° C. for at most 5 minutes. Thus, on the one hand, the formation of a chromium oxide layer and, on the other hand, so-called creeping are prevented or only enabled to a minimum degree.

The porous substrate 10 is manufactured from an iron alloy by sintering which has a chromium proportion which is larger than 25 weight percent. The substrate is composed, for example, of an alloy composed of 47% nickel (Ni), 22% chromium (Cr), 18% iron (Fe), 9% molybdenum (Mo), 1.5% cobalt (Co), 0.6% tungsten (W), 0.1% carbon (C), 1% manganese (Mn), 1% silicon (Si), and 0.008% boron (B).

The substrate has a useful porosity of 30% with respect to an overall volume of the substrate.

In this connection, the starting material P is injected into a plasma defocusing the material beam and is partially or completely melted therein or at least made plastic at a low process pressure which is at most 10,000 Pa or, in a more narrow range, at least 50 Pa and at most 2000 Pa for the described LPPS process. For this purpose, a plasma having a sufficiently high specific enthalpy is generated so that a very thin and dense layer 11 arises on the substrate. The variation of the structure is significantly influenced and can be controlled by the coating conditions, in particular the process enthalpy, the work pressure in the coating chamber as well as the process beam. Therefore, the process beam 2 has properties which can be determined by the controllable process parameters.

For the manufacture of the oxygen permeable membrane, the layer 11 is generated so that it has a very dense microstructure.

First of all the method step of generating the layer 11 by means of LPPS will be explained in detail.

A powder having a suitable composition is selected as a starting material P as explained in further detail, below. As already mentioned, the plasma flame is already very long during the LPPS method due to the set process parameters in comparison to conventional plasma spray. Furthermore, the plasma flame is very strongly widened. A plasma with a high specific enthalpy is generated, whereby a high plasma temperature results. A very high introduction of energy into the material particles 21 is brought about through the high enthalpy and the length and/or the size of the plasma flame, which material particles 21 are thereby, on the one hand, strongly accelerated and, on the other hand, brought to a very high temperature so that they melt on very well and are also very hot after their deposition on the substrate 10. Since, on the other hand, the plasma flame and thus the process beam 2 are very strongly widened, the local heat flow in the substrate 10 is so low so that a thermal damage of the material is avoided. It is in particular avoided that the porous structure of the substrate 10 is damaged at the boundary to the layer 11 which would influence the capability of use of the layer 10 as a membrane. The widened plasma flame further has the result that, typically on the one time covering of the substrate 10 with the process beam 2, the material particles 21 are deposited in the form of individual splats which do not yet generate a continuous layer, this means a connected layer. Thereby very thin layers 11 can be manufactured. The high kinetic and thermal energy which the material particles obtain during their long stay in the plasma flame in comparison to conventional plasma spray methods facilitate the formation of a very dense layer 11 which in particular has few boundary layer hollow spaces between splats lying on top of one another.

The plasma is generated, for example, in a plasma torch known per se in the plasma generator 3 having an electric direct current and is generated by means of a pin cathode as well as a ring-shaped anode. The power consumption of the plasma torch lies in the region of up to 180 kW. The power supplied to the plasma, the effective power, can be determined empirically with regard to the resulting layer structure. The effective power which that is provided by the difference between the electric power and the heat dissipated by cooling from experience lies, e.g., in the range of 40 to 130 kW, in particular 80 to 100 kW. For this purpose, it has been tried and tested when the electric current for the generation of the plasma lies between 1000 and 3000 A, in particular between 1500 and 2600 A.

A value of between 10 and 10,000 Pa, or a value between 50 and 2000 Pa, can be selected for the process pressure of the LPPS-TF plasma spraying for the generation of the oxygen permeable membrane in the process chamber 12.

The starting material P is injected into the plasma as powder material.

The process gas for the generation of the plasma can be a mixture of inert gases, in particular a mixture of argon Ar, helium He, and possibly hydrogen H. In practice, the following gas flow rates for the process gas have been tried and tested in particular:

Ar flow rate: 30 to 150 SLPM, in particular 50 to 100 SLPM;

$H_2$ flow rate: zero to 20 SLPM, in particular 2 to 10 SLPM;

He flow rate: zero to 150 SLPM, in particular 20 to 100 SLPM, with the overall flow rate of the process gas being, for example, smaller than 200 SLPM or, in a more narrow range, 100 to 160 SLPM.

It can be advantageous when the substrate is moved—additionally or alternatively—during the material deposition by means of rotational movement or pivotal movements relative to this cloud.

In the following, reference is made to the example particularly relevant for practice in which the oxygen permeable membrane is composed of a ceramic that, besides oxygen, includes the elements lanthanum (La), strontium (Sr), cobalt (Co), and iron (Fe). Such ceramics are referred to as LSCF. In this connection, it is driven for that the membrane should be composed as completely as possible of a perovskite structure.

However, it is to be understood that the invention is not limited to such substances, but in particular it is also suitable for other ceramic materials, specifically oxides of the perovskite type.

As mentioned above, the starting material P is provided in the form of a powder. The plasma spray method is then carried out so that the chemical composition of the layer is at least substantially the same as the chemical composition of the starting material.

LSCF as a ceramic material belongs to the oxides of the perovskite type which substantially have the form $ABO_3$. In this connection A represents $La_xSr_{1-x}$ and B represents $Co_yFe_{1-y}$. However, it should be noted that the stoichiometry must not necessarily be satisfied exactly. It is certainly possible that the La content and the Sr content and/or the Co content and the Fe content do not exactly match to one. Also, the oxygen content can deviate from the precise stoichiometry. For this reason, it is common to state the oxygen content with 3-σ, with σ being the deviation of the oxygen content from the stoichiometric equilibrium weight. The minus sign indicates that this deviation is generally an oxygen deficiency, that is, the oxygen is present under-stoichiometrically.

In the example described here, LACF is present in the form of $La_{0.58}Sr_{0.4}Co_{0.2}Fe_{0.8}O_{3-\sigma}$. The starting material P is present as powder. Different methods can be used for the manufacture of the powder particles: for example, spray drying or a combination of melting and subsequent breaking and/or grinding of the solidified melt.

The manufacture of such powders is known per se and does not require a detailed explanation in this context. In view of the plasma spraying, according to the invention, the powder seeds, for example, can have a size of 25+/−5 μm.

The value of σ for the deviation of the oxygen content from this stoichiometry, for example, amounts to 0.3.

For the two examples described in the following, $La_{0.58}Sr_{0.4}Co_{0.2}Fe_{0.8}O_{3-\sigma}$ is respectively used as the starting material. The process pressure in the process chamber 12 is set to a value between 50 and 2000 Pa. A plasma beam or a process beam 2 of high enthalpy is generated by means of a plasma torch which can generate a plasma of high specific enthalpy of up to 10,000 to 15,000 kJ/kg and which consumes a power of up to 180 kW. The process beam 2 has a length of 1000 to 2000 mm and a diameter of up to 200-400 mm. The length of the process beam 2 substantially corresponds to the spray distance, that is, the distance D between the exit nozzle 7 and the substrate 10. A porous plate of a high temperature nickel-based alloy or of a refractory ceramic serves, for example, as a substrate. The starting material P is introduced by means of two powder supplies, with the feed rate being 120 g/min, typically amounting to 40 g/min. By means of a pivot movement of the plasma torch, a thin and dense layer 11 is applied onto the substrate 10, with the high introduction of energy in the material particles 21 and the high (ultrasonic) velocity in the process beam 2 enabling a very dense structure of the layer 11. The layer 11 is sprayed up until it has an overall thickness of 20-60 μm. The coating time amounts to approximately one minute. During the thermal spraying, oxygen is supplied to the process chamber 12 and indeed has a flow rate of at least 1%, within the scope of the invention, at least 2% of the overall flow rate of a process gas. Hereby the reduction and the degradation of the starting material P or one of its components is avoided or at least strongly reduced. The deposition or the separation of elemental Co or Fe or their connections is avoided or at least strongly reduced. From this, it results that the chemical composition and the phase composition of the layer 11 is substantially the same as that of the starting material P.

Example 1

The process is carried out as is described above. The mixture of argon and helium is used as a process gas, with the Ar flow rate amounting to 80 SLPM and with the He flow rate amounting to 40 SLPM, so that the overall flow rate of the process gas amounts to 120 SLPM. The current for the generation of the plasma amounts to 2600 A.

Example 2

The process is carried out as is described above. A mixture of argon, helium, and hydrogen is used as a process gas, with the Ar flow rate amounting to 80 SLPM, the He flow rate amounting to 20 SLPM, and the $H_2$ flow rate amounting to 6 SLPM, so that the overall flow rate of the process gas amounts to 106 SLPM. The current for the generation of the plasma amounts to 2600 A.

In both cases oxygen permeable membranes result whose chemical composition and perovskite phase structure is substantially the same as that of the starting material.

A layer 11 acting as an oxygen permeable membrane on a porous substrate 10 is very schematically illustrated in FIG. 2. The substrate has pores 30 that are uniformly distributed in the substrate 10 and are thus connected amongst one another, such network of interconnected pores providing that the substrate 10 is gas-permeable. The mentioned connections cannot be seen in FIG. 2 since this is a very simplified illustration, on the one hand, and, on the other hand, only is a section in a plane. The pores are arranged, however, in three dimensions and extend within the height of the substrate between the rear substrate surface 32 and the coating surface 31. The layer 11 is arranged at a coating surface 31 of the substrate 10. A pressurized gas mixture contacts at a rear substrate side 32 lying opposite of the coating surface 31 from which mixture the oxygen should be extracted. The gas mixture is symbolized by the arrow 33. The gas mixture is transported to the coating surface 31 and thus to the layer 11 via the pores 30 connected amongst one another. Due to the permeability of the layer 11 for oxygen ions, these exit through the layer 11 and finally combine to oxygen molecules $O_2$. Thereby the oxygen is extracted from the gas mixture.

A section of the substrate 10 and the layer 11 is shown in a detailed view in FIG. 3. In this connection pores 30 open to the layer 11 are illustrated which likewise are connected to other pores. The pores 30 are formed between metal particles 34 which are combined by sintering. It can clearly be seen in FIG. 3 that the gas mixture can be guided to the layer 11 through the substrate 10.

In FIG. 4 a very schematic section of the substrate is illustrated in a top view. The pores 30 again form between the metal particles 34. A portion of an overall pore surface of an overall surface of the coating surface in this connection amounts to approximately 40%, this means that the portion of the non-hatched area to the overall surface of the illustrated rectangle amounts to approximately 40%. The mean pore size of the pores 30 in this connection amounts to at least 1 micrometer.

In FIG. 5 a substrate 110 having a layer 111 is illustrated. In order to improve the supply of the gas mixture to the layer 111 the substrate 110 has micro-passages 140 which can have a diameter of between 5 and 150 micrometers. The micro-passages 140 extend from a back substrate side 132 in the direction of a coating surface 131 at least partly within the height of the network of pores, and they end prior to arriving at the coating surface 131. The micro-passages 140 are introduced by laser drilling either before or after the coating.

The invention claimed is:

1. A plasma spray method for the manufacture of an ion conducting membrane using a plasma spray apparatus, said apparatus comprising:
a process chamber;
a substrate in the process chamber, the substrate designed to support the membrane;
the substrate comprising:
a coating surface;
a rear substrate side;
a network of pores extending within a height between the rear substrate side and the coating surface, the pores connected amongst one another so that the substrate is gas permeable;
an overall pore surface area as a portion of an overall area of the coating surface being at least 30%; and
micro-passages extending at least partly within the height of the network of pores between the rear substrate side and the coating surface;
said method comprising:
injecting a starting material into a plasma at a low process pressure no greater than 10000 Pa in the process chamber and at least partially melting the starting material; and
spraying the starting material onto the coating surface of the substrate by means of a process gas in the form of a process beam, thereby depositing the membrane as a layer on the substrate.

2. A plasma spray method according to claim 1, wherein: the pores have a mean pore size of at least one micrometer.

3. A plasma spray method according to claim 1, wherein: the micro-passages have diameters between 5 and 150 micrometers.

4. A plasma spray method according to claim 1, wherein: the substrate has a useful porosity of at least 20% with respect to an overall volume of the substrate.

5. A plasma spray method according to claim 1, wherein: the substrate has a useful porosity of at least 30% with respect to an overall volume of the substrate.

6. A plasma spray method according to claim 1, wherein: the rear substrate surface lies opposite the coating surface of the substrate; and
the micro-passages have respective ends that are spaced from the coating surface.

7. A plasma spray method according to claim 1, wherein: the single material is an iron alloy comprising chromium in an amount greater than 20 weight percent.

8. A plasma spray method according to claim 1, wherein: the substrate is made from an iron alloy comprising chromium in an amount greater than 25 weight percent.

9. A plasma spray method according to claim 1, wherein: process parameters are set during the method so that the substrate is at a temperature between 250° C. and 850° C.

10. A plasma spray method according to claim 9, wherein: process parameters are set during the method so that the temperature of the substrate is higher than 800° C. only for only a maximum period of time.

11. A plasma spray method according to claim 10, wherein: the maximum period of time is five minutes.

12. A plasma spray method according to claim 1, wherein: the layer forming the membrane comprises a ceramic material that is a perovskite-type oxide.

13. A plasma spray method according to claim 12, wherein: the layer forming the membrane comprises at least one of the following: lanthanum (La), strontium (Sr), cobalt (Co), iron (Fe), chromium (Cr), titanium (Ta), barium (Ba), zirconium (Zr), cerium (Ce), yttrium (Y), ytterbium (Yb), europium (Eu) or aluminum (Al).

14. A plasma spray method according to claim 1, wherein: the layer forming the membrane has a thickness of less than 150 micrometers.

15. A plasma spray method according to claim 1, wherein: the layer forming the membrane has a thickness between 20 and 60 micrometers.

16. A plasma spray method according to claim 1, wherein: the process gas has an overall flow rate less than 200 SLPM.

17. A plasma spray method according to claim 1, wherein: the process gas has an overall flow rate between 100 and 160 SLPM.

18. A plasma spray method according to claim 1, wherein: the process gas is a mixture of argon and helium.

19. A plasma spray method according to claim 1, wherein: during the spraying, the process beam is pivoted or rastered in relation to the coating surface of the substrate.

20. A plasma spray method according to claim 1, wherein: the method creates a membrane comprising a member of the group consisting of a hydrogen ion conducting membrane and an oxygen ion conducting membrane.

21. A plasma spray method according to claim 1, wherein: an overall pore area as a portion of an overall area of the coating surface is at least 40%.

22. A combination of a substrate and an ion conducting membrane, the combination comprising:
the substrate comprising:
a coating surface;
a rear substrate side;
a network of pores extending within a height between the rear substrate side and the coating surface, the pores connected amongst one another so that the substrate is gas permeable;
an overall pore surface area as a portion of an overall area of the coating surface being at least 40%; and
micro-passages extending at least partly within the height of the network of pores between the rear substrate side and the coating surface;
the ion conducting membrane positioned on the substrate by having been deposited as a layer on the substrate with a plasma spray apparatus in a process chamber by injecting a starting material into a plasma at a low process pressure no greater than 10000 Pa in the process chamber, and at least partially melting the starting material, and spraying the starting material onto the coating surface of the substrate by means of a process gas in the form of a process beam.

23. A combination of a substrate and an ion conducting membrane according to claim 22, wherein:
the membrane comprises a member of the group consisting of a hydrogen ion conducting membrane and an oxygen ion conducting membrane.

24. A plasma spray method for the manufacture of an ion conducting membrane using a plasma spray apparatus, said apparatus comprising:
a process chamber;
a substrate in the process chamber, the substrate designed to support the membrane;
the substrate comprising:
a coating surface;
a rearmost substrate surface;
a network of pores extending from the rearmost substrate surface toward the coating surface, the pores connected amongst one another so that the substrate is gas permeable; and an overall pore surface area as a portion of an overall area of the coating surface being at least 30%;

said method comprising:

injecting a starting material into a plasma at a low process pressure no greater than 10000 Pa in the process chamber and at least partially melting the starting material; and spraying the starting material onto the coating surface of the substrate by means of a process gas in the form of a process beam, thereby depositing the membrane as a layer on the substrate.

* * * * *